United States Patent [19]

Baines et al.

[11] Patent Number: 4,886,659

[45] Date of Patent: Dec. 12, 1989

[54] COLOR PRODUCTION

[75] Inventors: David A. Baines, Ely; Paul K. Filby, Bury St. Edmunds; Marek P. J. Kierstan, Whittlesford, all of England

[73] Assignee: Dalgety U.K. Limited, London, England

[21] Appl. No.: 155,976

[22] Filed: Feb. 16, 1988

[30] Foreign Application Priority Data

Feb. 18, 1987 [GB] United Kingdom ............... 8703718

[51] Int. Cl.$^4$ ............................................. A61K 7/021
[52] U.S. Cl. ..................................... 424/63; 426/250; 426/540
[58] Field of Search ................... 426/540, 250; 424/63

[56] References Cited

U.S. PATENT DOCUMENTS 2,305,940  9/1939  Walsh ................................. 426/648
4,144,357  3/1979  Mohammed ..................... 426/103 X

OTHER PUBLICATIONS

H. E. Nursten, "Food Chemistry", 6, (1980-1981), pp. 263-277.
J. P. Danehy, "Advances in Food Research", vol. 30, C. O. Chichester et al., ed., Academic Press, 1986, 77-138.
Copson et al., "Browning Methods in Microwave Cooking", Agricultural & Food Chemistry, vol. 5, 1955, pp. 424-427.
Van den Ouweland et al., Occurrence of Amadori and Heyns Rearrangement Products etc., 1978, pp. 131-143.

Primary Examiner—Joseph L. Schofer
Assistant Examiner—Jeffrey T. Smith
Attorney, Agent, or Firm—Nies, Webner, Kurz & Bergert

[57] ABSTRACT

A process of producing a distinctive color comprises the steps of providing an aqueous mixture of Maillard reactants (a) and (b), and exposing the aqueous mixture to drying and reactive conditions such as spray drying, wherein substantially all the water is rapidly evaporated to yield a dry product having a color which is distinctive relative to the aqueous mixture. Examples of Maillard reactants include various sugars one of which is dextrose, and various amino acids one of which is glycine.

21 Claims, No Drawings

COLOR PRODUCTION

The Maillard reaction is known in for example food chemistry in relation to the production of colours and flavours.

The reaction involves for example an aldose or ketose sugar and an amino compound as starting materials and apparently may be regarded as including the following three stages:

(a) N-substituted glycosylamine formation followed by rearrangement to form Amadori (1-amino-1-deoxy-2-ketose) or Heyns (2-amino-2-deoxy-aldose) intermediates;

(b) dehydration reactions, fission reactions and Strecker degradation reactions; and (c) conversion of carbonyl compounds formed by stages (a) and (b) into coloured compounds known as melanoidins.

Amino compounds which can take part in the Maillard reaction include for example various amino acids or derivatives.

Other possible reactants besides aldose and ketose sugar, for reaction with amino compounds in a Maillard reaction include ascorbic acid, dehydroascorbic acid and Maillard intermediates derived from ketose or aldose sugars e.g. glyoxal, methyl glyoxal, 3-hydroxy-2-butanone and diacetyl. It will be noted that all these reactants exhibit an aldehyde and/or ketose function.

For further details of the Maillard reaction reference may be made to H. E. Nursten "Food Chemistry" 6 (1980-81) pp. 263-277, and to J. P. Danehy "Advances in Food Research" Volume 30, Editors C. O. Chichester et al.; Academic Press Inc. 1986 pp. 77-138; the entire disclosure of these two papers is incorporated herein by reference.

The Maillard reaction takes place naturally under the prolonged heating conditions involved in the normal cooking of foods, but surprisingly we have found that colours can be produced from Maillard starting materials under the very short-lived reaction conditions of for example spray drying e.g. a reaction time of less than ten seconds or sometimes less than one second before substantially all the water is evaporated effectively precluding further reaction. For details of the spray drying process reference may be made to Masters "Spray Drying Handbook" 3rd Edition, George Godwin Ltd. London, 1979, the entire disclosure of which is incorporated herein by reference.

The expectation would have been that under spray drying conditions the Maillard reaction would not have proceeded beyond stages (a) and (b) which precede mealanoidin formation.

By adjustment of initial reactants, ratios, concentrations and other spray drying conditions, and physicochemical criteria, a range and intensity of colours can be produced; from for example light to very deep browns, yellows, brown/reds or pinks and greys.

The colours apparently have a good shelf life, if stored in dry and cool conditions.

The colour range can be used for example in the following technical applications:

Retorted products e.g.—pet foods, canned vegetables, meat preparations and canned fruit;
Aseptic processes e.g.—pet foods, vegetables, meat preparation, fruit and dairy products;
Extruded products e.g.—snack foods, cooking aids, pet foods;
Baked products e.g.—biscuits, cakes, meat dishes;
Soft drinks;
Alcoholic beverages;
Dairy products e.g.—yoghurts, instant whips, custards;
Frozen foods;
Fried foods;
Microwave applications;
Agricultural products;
Flavourings;
Cosmetics;
Pharmaceuticals;
Pet foods;
Confectionery.

The invention provides a process of producing a distinctive colour comprising the steps of providing an aqueous Maillard reaction mixture obtained from Maillard reactants (a) and (b), and exposing the aqueous mixture to drying and reactive conditions (e.g. spray drying) wherein substantially all the water is rapidly evaporated (e.g. in less than 10 seconds) to yield a dry product having a colour which is dinstinctive relative to the aqueous mixture.

The proportions by weight of the Maillard reactant (a) to the Maillard reactant (b) are for example substantially 1:1.

The invention also provides a process of producing a distinctive colour comprising the steps of providing an aqueous Maillard reaction mixture obtained from Maillard reactants comprising (a) an aldose of ketose sugar or Maillard intermediate derived from said sugar, and (b) an amino acid; and exposing the aqueous mixture to spray drying wherein substantially all the water is rapidly evaporated to yield a dry product having a colour which is distinctive relative to the aqueous mixture.

Another process besides spray drying in which reaction times can be short lived on account of rapid evaporation of water is for example roller drying.

The invention also comprehends product aspects.

It is believed the products of a process according to the invention themselves have novel chemical structures, but attempts to analyse the products by mass spectrometry and chromatography failed to reveal definite structures owing to their complexity.

The current trend in for example food production is for "natural" colours. Artificial colours in particular have been under a great deal of pressure and natural alternatives have proved expensive and generally not as effective. Various natural versions of colours have been developed during this upsurge in public awareness. A similar position obtains in other industries, for example, cosmetics and pharmaceuticals.

The colours produced by a process according to the invention are apparently essentially natural in constitution, and the processing conditions being rapid and relatively mild, the risk of producing toxic substances is much less than with the usual prior art methods of producing comparable colours. Also the relatively strong hue of the colours embodying the invention means that they can be applied to foodstuffs etc. at lower levels.

Again surprisingly however the production of the flavours associated with Maillard reactions apparently does not occur to any great extent.

In a spray drying process embodying the invention by way of example the amino compounds and aldoses or ketoses are selected and dry mixed or homogenized; pH adjusters as desired may also be added. A water soluble spray drier carrier material e.g. malto dextrin, starch or gum is also selected and added to the mixture. Water may then be added so as to arrive at an appropriate concentration of the aqueous mixture.

The spray drier carrier material is used for example to provide stability, enhance shelf life, and avoid loss of volatiles during the spray drying step, but it is not always necessary. The carrier material apparently survives intact through the spray drying step and thus can in itself provide nutritive value.

The temperature and residence time characteristics of the spray drying process are set as appropriate. The spray drying may be carried out in a spray drier comprising e.g. a stationary spray nozzle or a spinning disc, the settings of which control the droplet size, dry particle size and other particle characteristics.

Typically for example the non-aqueous content of the aqueous mixture fed to the spray drier is 10-65% (e.g. up to 40%) by weight, its pH 3-8 e.g. 4.5-6, the inlet temperature of hot drying air into the spray drier chamber 150°-400° C. e.g. 220°-300° C. and the air outlet temperature 90°-150° C. e.g. about 120° C. According to Masters (referred to hereinabove) the temperature of reaction is believed to approximate that of the outlet air temperature. In order to improve solubility characteristics the aqueous mixture may be preheated e.g. up to 60° C. before feeding to the spray drier. The moisture content of the spray dried product is for example 3.5-15% by weight.

The ratio of sugar to amino compound can vary widely for example from 1:99 to 99:1 by weight but preferred proportions of sugar to amino compounds are 1:1 by weight.

The amount of carrier material may also vary widely e.g. from 0.-95% (preferably 30-60%) dry basis of the mixture fed to the spray drier.

| Starting Materials |
|---|
| Amino Acids |
| Alanine |
| Arginine |
| Asparagine |
| Aspartic Acid |
| Cysteine |
| Cystine |
| Glutamic Acid |
| Glutamine |
| Glycine |
| Histidine |
| Leucine |
| iso Leucine |
| Lysine |
| Methionine |
| Phenylalanine |
| Proline |
| Serine |
| Taurine |
| Threonine |
| Tryptophan |
| Tyrosine |
| Valine |

These amino acids e.g. may be in their: D, DL, L, β, free base, hydrochloride, anhydrous, hydrated crystalline or powder form, as appropriate.

Mixtures of amino acids may also be used either prepared by blending one or more individual amino acids or employing hydrolysed vegetable or animal protein, which comprises a natural mixture of amino acids.

| Aldoses and Ketoses |
|---|
| Arabinose - an aldose |
| Dextrose - an aldose |
| Fructose - a ketose |
| Galactose - an aldose |
| Lactose - a disaccharide with aldose and ketose moieties |
| Maltose - a dialdose |
| Mannose - an aldose |
| Raffinose - a trialdose |
| Ribose - an aldose |
| Sucrose - a disaccharide with aldose and ketose moieties |
| Xylose - an aldose |
| Glyceraldehyde - an aldose |

These materials e.g. may be in their: D, L, DL, α, β, αβ, anhydrous or hydrated form as appropriate

| Carrier Materials |
|---|
| Malto dextrin |
| Potato starch |
| Corn starch |
| Gum arabic |
| Monosodium glutamate |
| Gum guar |
| Cyclodextrin |
| Salt |
| pH Adjusters |
| Malic acid |
| Citric acid |
| Lactic acid |
| Hydrochloric acid |

In the following Examples a Niro mobile spray dryer MINOR (A/S Niro Atomizer of Denmark) was used; this is of the spinning disc type with a chamber 600 mm in cylindrical height 800 mm in diameter and a conical base having a 60° angle of conicity.

The dryer operated under the following conditions:
substantially atmospheric pressure
disc speed: 35,000–40,000 rpm.
flow rate of drying air: 80 kg/hr.

In each of the following Examples 1-10 the materials were dry mixed and water added to achieve the appropriate concentration of the feed mixture.

EXAMPLE 1

| Material | Parts by Weight |
|---|---|
| Fructose | 15 |
| L—Proline | 15 |
| Malto dextrin | 20 |
| | 50 |
| Non-aqueous content of feed mixture: | |
| Spray drying conditions: | 50% by weight |
| Chamber inlet air temperature | 170° C. |
| Chamber outlet air temperature | 105° C. |
| Resultant colour - dark brown - chocolate like | |

EXAMPLE 2

| Material | Parts by Weight |
|---|---|
| Fructose | 10 |
| Dextrose monohydrate | 5 |
| L—Arginine | 10 |
| Glycine | 5 |
| 'Encapsol' (a potato derived starch) | 25 |
| | 55 |
| Non-aqueous content of feed mixture: | |

EXAMPLE 3

| Material | Parts by Weight |
| --- | --- |
| Dextrose monohydrate | 15 |
| Arginine | 15 |
| Gum arabic | 60 |
|  | 90 |
| Non-aqueous content of feed mixture: Spray drying conditions: | 47.4% by weight |
| Chamber inlet air temperature | 170° C. |
| Chamber outlet air temperature | 108° C. |
| Resultant colour - light golden brown - Tandoori | |

EXAMPLE 4

| Material | Parts by Weight |
| --- | --- |
| D-Xylose | 30 |
| L—Histidine | 30 |
| Malto dextrin | 40 |
|  | 100 |
| Non-aqueous content of feed mixture: Spray drying conditions: | 45.5% by weight |
| Chamber inlet air temperature | 175° C. |
| Chamber outlet air temperature | 110° C. |
| Resultant colour - dark saffron yellow - mustard. | |

In each of the following Examples 5–8 the non-aqueous content of the feed mixture was 50% by weight, the chamber inlet air temperature 170° C. and the chamber outlet air temperature 100° C.

EXAMPLE 5

| Material | Parts by Weight |
| --- | --- |
| D-Xylose | 15 |
| Glycine | 15 |
| Malto dextrin | 20 |
|  | 50 |
| Resultant colour - deep brown - caramel | |

EXAMPLE 6

| Material | Parts by Weight |
| --- | --- |
| Dextrose monohydrate | 15 |
| Glycine | 15 |
| Malto dextrin | 20 |
|  | 50 |
| Resultant colour - dark brown.- caramel | |

EXAMPLE 7

| Material | Parts by Weight |
| --- | --- |
| D-Xylose | 15 |
| L—Leucine | 15 |
| Malto dextrin | 20 |
|  | 50 |
| Resultant colour - pale yellow - cheese | |

EXAMPLE 8

| Material | Parts by Weight |
| --- | --- |
| D-Xylose | 15 |
| DL—Lysine | 15 |
| Malto dextrin | 20 |
|  | 50 |
| Resultant colour - brown with orange tint. | |

In each of the following Examples 9–13 the non-aqueous content of the feed mixture was 50% by weight.

EXAMPLE 9

| Material | Parts by Weight |
| --- | --- |
| DL—Glyceraldehyde | 15 |
| Glycine | 15 |
| Malto dextrin | 70 |
|  | 100 |
| Spray drying conditions: | |
| Chamber inlet air temperature | 150° C. |
| Chamber outlet air temperature | 105° C. |
| Resultant colour - chocolate brown. | |

EXAMPLE 10

| Material | Parts by Weight |
| --- | --- |
| Ascorbic acid | 15 |
| Glycine | 15 |
| Malto dextrin | 70 |
|  | 100 |
| Spray drying conditions: | |
| Chamber inlet air temperature | 155° C. |
| Chamber outlet air temperature | 105° C. |
| Resultant colour - pale yellow - orange | |

In each of the following Examples 11–13 the materials were blended in water to achieve a 50% dry weight non-aqueous content of the feed mixture.

EXAMPLE 11

| Material | Parts by Weight |
| --- | --- |
| 3-Hydroxy-2-butanone | 15 |
| Glycine | 15 |
| Malto dextrin | 70 |
|  | 100 |
| Spray drying conditions: | |
| Chamber inlet air temperature | 155° C. |
| Chamber outlet air temperature | 105° C. |
| Resultant colour - lime yellow | |

EXAMPLE 12

| Material | Parts by Weight |
| --- | --- |
| Diacetyl | 15 |
| Glycine | 15 |

-continued (page 5)

| Spray drying conditions: | 47.8% by weight |
| --- | --- |
| Chamber inlet air temperature | 200° C. |
| Chamber outlet air temperature | 115° C. |
| Resultant colour - dark orange brown or golden brown - light curry | |

| | |
|---|---|
| Malto dextrin | 70 |
| | 100 |

| Spray drying conditions: | |
|---|---|
| Chamber inlet air temperature | 150° C. |
| Chamber outlet air temperature | 100° C. |
| Resultant colour - light orange | |

EXAMPLE 13

| Material | Parts by Weight |
|---|---|
| Glyoxal | 6 |
| Glycine | 15 |
| Malto dextrin | 70 |
| | 91 |

| Spray drying conditions: | |
|---|---|
| Chamber inlet air temperature | 150° C. |
| Chamber outlet air temperature | 105° C. |
| Resultant colour - ginger brown | |

EXAMPLE 14

| Material | Parts by Weight (dry basis) |
|---|---|
| "Liquid Xylose" | 22.5 |
| Hydrolysed animal protein | 32.5 |
| | 55.0 |

The hydrolysed animal protein is that sold in the United Kingdom under the trade name SMITS by Messrs. Siber Hegner Limited to Beckenham, Kent, England. It is derived from fresh beef and/or pork bones and comprises a mixture of iso leucine, leucine, lysine, methionine, cystine, phenylalanine, tyrosine, threonine, tryptophan, valine, arginine, histidine, alanine, aspartic acid, glutamic acid, glycine, proline and serine.

"Liquid Xylose" is a commercial product comprising at least 65% by weight (dry basis), xylose, up to 15% arabinose, up to 15% dextrose and up to 5% other sugars, all in aqueous solution.

The "liquid xylose" having a non-aqueous content of 65% by weight was mixed in equal proportions with an aqueous solution containing 45% by weight of the hydrolysed animal protein; the non-aqueous content of the feed mixture to be spray dried was therefore 55% by weight.

| Spray drying conditions: | |
|---|---|
| Chamber inlet air temperature | 150° C. |
| Chamber outlet air temperature | 100° C. |
| Resultant colour - deep brown. | |

EXAMPLE 15

This Example illustrates the wide variations possible in the sugar/amino acid ratio.

| Material | Parts by Weight |
|---|---|
| Dextrose monohydrate | 50 |
| Glycine | |

| Material | Parts by Weight |
|---|---|
| Malto dextrin | 50 |

These materials were dry mixed and water added to achieve a non-aqueous content of the feed mixture for spray drying of 50% by weight.

| Spray drying conditions: | |
|---|---|
| Chamber inlet air temperature | 170° C. |
| Chamber outlet air temperature | 110° C. |

| | Parts by Weight | |
|---|---|---|
| | Dextrose monohydrate | Glycine |
| (a) | 99 | 1 |
| (b) | 95 | 5 |
| (c) | 90 | 10 |
| (d) | 50 | 50 |
| (e) | 40 | 60 |
| (f) | 30 | 70 |
| By | | |
| (g) | 20 | 80 |
| (h) | 10 | 90 |
| (i) | 5 | 95 |
| (j) | 1 | 99 |

The resultant colours varied from light brown—cereal for Example 15(a) through to orange brown for Example 15(d), and sandy for Example 15(f) to cream for Example 15(j).

No significant effect was obtained in the absence of glycine (i.e. with 100% dextrose monohydrate) or in the absence of dextrose monohydrate (100% glycine).

EXAMPLE 16

| Material | Parts by Weight |
|---|---|
| Dextrose monohydrate | 35 |
| Glycine | 35 |
| Malto dextrin | 10 |
| Encapsol | 20 |
| | 100 |

The materials were dry mixed and blended into aqueous solution using a high speed mixer. The non-aqueous content of the feed mixture was 40% by weight.

Chamber inlet air temperature: 280° C.
Chamber outlet air temperature: 125° C.
Resultant colour—dark brown-caramel.
Spray dried product moisture content: about 5%.

In the above Examples 1–16 we found that on repetition of an Example, the colour given was reproducible.

We claim:

1. A process of producing a distinctive color comprising the steps of providing an aqueous Maillard reaction mixture obtained from Maillard reactants comprising (a) an aldose or ketose sugar or Maillard intermediate derived from said sugar, and (b) an amino acid; and reacting the aqueous mixture at a temperature of at least 100° C. under drying conditions whereby substantially all the water is rapidly evaporated to yield a dry product having a color which is distinctive relative to the aqueous mixture.

2. A process according to claim 1, wherein said drying conditions comprise spray drying.

3. A process according to claim 1 or claim 2, wherein the non-aqueous content of the aqueous mixture is up to 40 percent by weight.

4. A process according to claim 1 or claim 2, wherein the aqueous mixture also comprises a carrier material.

5. A process according to claim 1 or claim 2, wherein the temperature of said drying and reactive conditions is 100° to 150° C.

6. A process according to claim 1 or claim 2, wherein the Maillard reactant (a) is selected from the group consisting of: arabinose, dextrose, fructose, galactose, lactose, maltose, mannose, raffinose, ribose, sucrose, xylose, and glyceraldehyde.

7. A process according to claim 1 or claim 2, wherein the Maillard reactant (b) is selected from the group consisting of: alanine, arginine, asparagine, aspartic acid, cysteine, cystine, glutamic acid, glutamine, glycine, histidine, leucine, iso leucine, lysine, methionine, phenylalanine, proline, serine, taurine, threonine, tryptophan, tyrosine, valine and hydrolysed vegetable or animal protein.

8. A process according to claim 1 or claim 2, wherein the proportions by weight of the Maillard reactant (a) to the Maillard reactant (b) are substantially 1:1.

9. A process according to claim 1 or claim 2, wherein the Maillard reactant (a) is dextrose and the Maillard reactant (b) is glycine.

10. A process according to claim 9, wherein the aqueous mixture comprises a carrier material comprising malto dextrin and starch.

11. A method of coloring foods, beverages, agricultural products, cosmetics, or pharmaceuticals by the incorporation of a product of a process according to claim 1 or claim 2.

12. A food, beverage, agricultural product, cosmetic or pharmaceutical containing a product of a process according to claim 1 or claim 2.

13. A color produced by a process according to claim 1 or claim 2, wherein the Maillard reactants are selected from the group consisting of:
 (a) fructose and proline;
 (b) fructose, dextrose, arginine and glycine;
 (c) dextrose and arginine;
 (d) xylose and histidine;
 (e) xylose and glycine;
 (f) dextrose and glycine;
 (g) xylose and leucine;
 (h) xylose and lysine;
 (i) glyceraldehyde, ascorbic acid, 3-hydroxy-2-butanone, diacetyl, or glyoxal; and glycine; and
 (j) a mixture of sugars comprising xylose, arabinose, and dextrose; and hydrolysed animal protein.

14. A process according to claim 1 or claim 2, wherein said water is evaporated in less than 10 seconds.

15. A process according to claim 1 or claim 2, wherein said temperature is about 120° C.

16. A process according to claim 1 or claim 2, wherein the aqueous mixture also comprises a carrier material selected from the group consisting of maltodextrin starch and gum.

17. A process of producing a range of distinctive colors comprising the steps of (I) providing an aqueous Maillard reaction mixture obtained from Maillard reactants comprising (a) an aldose or ketose sugar or Maillard intermediate derived from said sugar, and (b) an amino acid; (II) reacting the aqueous mixture at a temperature of at least 100 degrees C. under spray drying conditions whereby substantially all the water is rapidly evaporated to yield a dry product having a color which is distinctive relative to the aqueous mixture; and (III) varying the nature of at least one of the Maillard reactants (a) and (b), and repeating steps (I) and (II) to yield another dry product having a different distinctive color.

18. A process according to claim 17, wherein the temperature of said drying and reactive conditions is 100° to 150° C.

19. A process according to claim 17, wherein the Maillard reactant (a) is selected from the group consisting of: arabinose, dextrose, fructose, galactose, lactose, maltose, mannose, raffinose, ribose, sucrose, xylose, and glyceraldehyde.

20. A process according to claim 17, wherein the Maillard reactant (b) is selected from the group consisting of: alanine, arginine, asparagine, aspartic acid, cysteine, cystine, glutamic acid, glutamine, glycine, histidine, leucine, iso leucine, lysine, methionine, phenylalanine, proline, serine, taurine, threonine, tryptophan, tyrosine, valine and hydrolysed vegetable or animal protein.

21. A color produced by a process according to claim 17, wherein the Maillard reactants are selected from the group consisting of:
 (a) fructose and proline;
 (b) fructose, dextrose, arginine and glycine;
 (c) dextrose and arginine;
 (d) xylose and histidine;
 (e) xylose and glycine;
 (f) dextrose and glycine;
 (g) xylose and leucine;
 (h) xylose and lysine;
 (i) glyceraldehyde, ascorbic acid, 3-hydroxy-2-butanone, diacetyl, or glyoxal; and glycine; and
 (j) a mixture of sugars comprising xylose, arabinose, and dextrose; and hydrolysed animal protein.

* * * * *